United States Patent [19]
Nakamura

[11] Patent Number: 5,462,032
[45] Date of Patent: Oct. 31, 1995

[54] FUEL INJECTION TIMING CONTROL DEVICE AND METHOD FOR INTERNAL COMBUSTION ENGINE

[75] Inventor: Hisashi Nakamura, Higashimatsuyama, Japan

[73] Assignee: Zexel Corporation, Tokyo, Japan

[21] Appl. No.: 297,842

[22] Filed: Aug. 30, 1994

[30] Foreign Application Priority Data

Sep. 7, 1993 [JP] Japan ................................. 5-246424

[51] Int. Cl.$^6$ ........................... F02M 37/04; F02D 1/02
[52] U.S. Cl. ........................ 123/501; 123/502; 123/357
[58] Field of Search ........................ 123/494, 506, 123/305, 488, 500–502, 357; 73/119 A

[56] References Cited

U.S. PATENT DOCUMENTS

| | | | |
|---|---|---|---|
| 4,522,174 | 6/1985 | Babitzka et al. | 123/305 |
| 4,669,440 | 6/1987 | Takase et al. | 123/49 A |
| 4,748,447 | 5/1988 | Oshizawa | 73/119 A |
| 4,766,863 | 8/1988 | Fujimori | 123/500 |
| 4,788,960 | 12/1988 | Oshizawa | 123/506 |
| 4,838,080 | 6/1989 | Okano | 73/119 A |
| 5,107,700 | 4/1992 | Kuttner et al. | 73/119 A |
| 5,115,783 | 5/1992 | Nakamura | 123/500 |
| 5,116,342 | 5/1992 | Schmidt et al. | 73/119 A |
| 5,375,575 | 12/1994 | Ohishi et al. | 123/506 |

*Primary Examiner*—Thomas N. Moulis
*Attorney, Agent, or Firm*—Sughrue, Mion, Zinn, Macpeak and Seas

[57] ABSTRACT

A fuel injection timing control device includes a lift sensor for detecting a lift amount of a needle valve of a fuel injection nozzle, rectangular wave conversion means for converting an output signal of the lift sensor to a rectangular wave with a predetermined threshold level, and ignition point calculating means for calculating a timing for actual fuel ignition on the basis of the converted rectangular wave in accordance with a driving condition of the internal combustion engine, wherein the fuel injection control is performed on the basis of the calculated ignition timing.

9 Claims, 3 Drawing Sheets

FIG. 4

| | Ne1 | | Ne2 | |
|---|---|---|---|---|
| Q1 | ITs11 | Vs11 | ITs12 | Vs12 |
| | m11 | n11 | m12 | n12 |
| Q2 | ITs21 | Vs21 | ITs22 | Vs22 |
| | m21 | n21 | m22 | n22 |
| | | | | |

FUEL INJECTION TIMING CONTROL DEVICE AND METHOD FOR INTERNAL COMBUSTION ENGINE

BACKGROUND OF THE INVENTION

1. Field of the Invention

This invention relates to control device and method for controlling a fuel injection timing for use in an internal combustion engine, and particularly to control device and method for controlling a fuel injection timing to a proper timing irrespective of variations of engine driving conditions, such as variation of viscosity of fuel, by detecting a lift timing of a needle valve for a fuel injection nozzle and determining a target lift timing.

2. Description of Related Art

In an internal combustion engine such as a diesel engine, fuel is forcedly fed from a fuel injection pump to a fuel injection nozzle at a controlled timing within a rotational period of an engine while pressurized by the fuel injection pump. When the fuel is fed into the fuel injection nozzle, a needle valve which is urged by a spring is pushed (lifted) up by the pressure of the fuel itself to open a fuel injection port, whereby the fuel is injected through the fuel injection port into a combustion chamber.

Such a fuel injection mechanism is generally provided with a fuel injecting timing control device for detecting a lift timing of a needle valve and performing a feedback control so that the detected lift timing is coincident with a target lift timing which is beforehand determined, as disclosed in Japanese Laid-open Patent Application No. 4-17754.

The conventional fuel injection Liming control device as described above is equipped with a sensor for detecting the lift motion of the needle valve, and a start timing of the lift of the needle valve, that is, a start timing of the fuel injection is detected on the basis of an output signal from the sensor. Further, the fuel injection timing control device is equipped with a map containing various fuel injection timings which are optimally determined in accordance with various loads (injection amounts) and rotating numbers of the engine in advance. In a driving condition, a fuel injection timing which is optimal to the driving condition (load, rotating number) is read out from the map, and the read-out timing is used as a target fuel injection timing. The timing of the forced fuel feeding of the fuel injection pump is controlled so that the detected lift start timing of the needle valve is coincident with the target fuel injection timing.

In the conventional fuel injection control device as described above, if any engine driving condition, particularly viscosity of fuel, is varied, excess and deficiency would occur in a spark advance for the fuel injection timing, resulting in aggravation of noises, aggravation of emission, failure of ignition, etc.

FIGS. 1A, 1B and 1C are graphs each showing the waveform of an output signal of the needle valve lift sensor, that is, variation of an lift amount of the needle valve under various conditions. Specifically, FIG. 1A shows the waveform of the output signal under the condition of low speed and low load, FIG. 1B shows the waveform of the output signal under the condition of intermediate speed and intermediate load, and FIG. 1C shows the waveform of the output signal under the condition of high speed and high load. In the figures, waveforms as indicated by a solid line and a dotted line are obtained in case of using fuels having different viscosity. Further, a point A represents a start timing of the needle valve, and it is a timing which is a control target by the conventional control device. On the other hand, a point B represents a timing when an accumulation amount of fuel in a combustion chamber reaches an amount which is required for ignition, that is, an amount at which the fuel can be ignited (hereinafter referred to as "ignition point"). Actually, the phase of the point B, not the point A, greatly effects emission, failure of ignition and other phenomena.

In addition, particularly when a phase distance (difference) between the point A and the point B is greatly varied in accordance with viscosity of fuel as shown in FIG. 1B (intermediate speed and intermediate load), it is impossible to control the point B to a proper timing at all times irrespective of viscosity of fuel.

In view of the foregoing, in order to perform a proper fuel injection timing control, the point B (not the point A) should be originally used as a control target. However, as described above, in the conventional fuel injection timing control device, the point A is used as a control target, and thus there are the disadvantages as described above.

SUMMARY OF THE INVENTION

An object of the present invention is to provide a fuel injection timing control device for an internal combustion engine in which an ignition point (timing) in a fuel injection process can be controlled to a proper timing at all times irrespective of variation of various engine driving conditions such as fuel viscosity.

In order to attain the above object, according to one aspect of the present invention, the fuel injection timing control device includes a lift sensor for detecting a lift amount of a needle valve of a fuel injection nozzle, rectangular wave conversion means for converting an output signal of the lift sensor to a rectangular wave with a predetermined threshold level, and ignition point calculating means for calculating a timing for actual fuel ignition on the basis of the converted rectangular wave in accordance with a driving condition of the internal combustion engine, wherein the calculated ignition timing is used as a control target.

According to another aspect of the present invention, a fuel injection timing control method for an internal combustion engine comprises the steps of detecting a lift amount of a needle valve of a fuel injection nozzle to obtain a signal representing the lift amount, converting the signal to a rectangular wave using a predetermined threshold level, calculating a timing for fuel ignition on the basis of the rectangular wave in accordance with a driving condition of the internal combustion engine, comparing the calculated fuel ignition timing with a predetermined target ignition fuel timing, and controlling an actual fuel injection timing so that the calculated fuel ignition timing is coincident with the target ignition fuel timing.

According to the fuel injection timing control device of the present invention, the signal output from the lift sensor is converted to a rectangular wave using a predetermined threshold level. Subsequently, a prescribed position corresponding to a driving condition of the internal combustion engine is calculated as a point corresponding to actual ignition of fuel within the time width of the rectangular wave. The fuel injection is controlled so that the point of the ignition is coincident with a target timing which is beforehand determined.

By setting the threshold level to a proper value, the timing of the actual ignition, the timing of the point corresponding to the actual ignition within the rectangular wave can be set to a substantially constant value irrespective of the fuel viscosity, so that the ignition point can be controlled to a proper timing at all times.

BRIEF DESCRIPTION OF THE DRAWINGS

FIG. 1A is a graph showing the waveform for low-speed and low-load condition, FIG. 1B is a graph showing the waveform for intermediate-speed and intermediate-load condition, and FIG. 1C is a graph showing the waveform for high-speed and high-load condition;

FIG. 4 is a table showing a map used in the embodiment.

DETAILED DESCRIPTION OF THE PREFERRED EMBODIMENT

A preferred embodiment according to this invention will be described with reference to the accompanying drawings.

Figure 2:
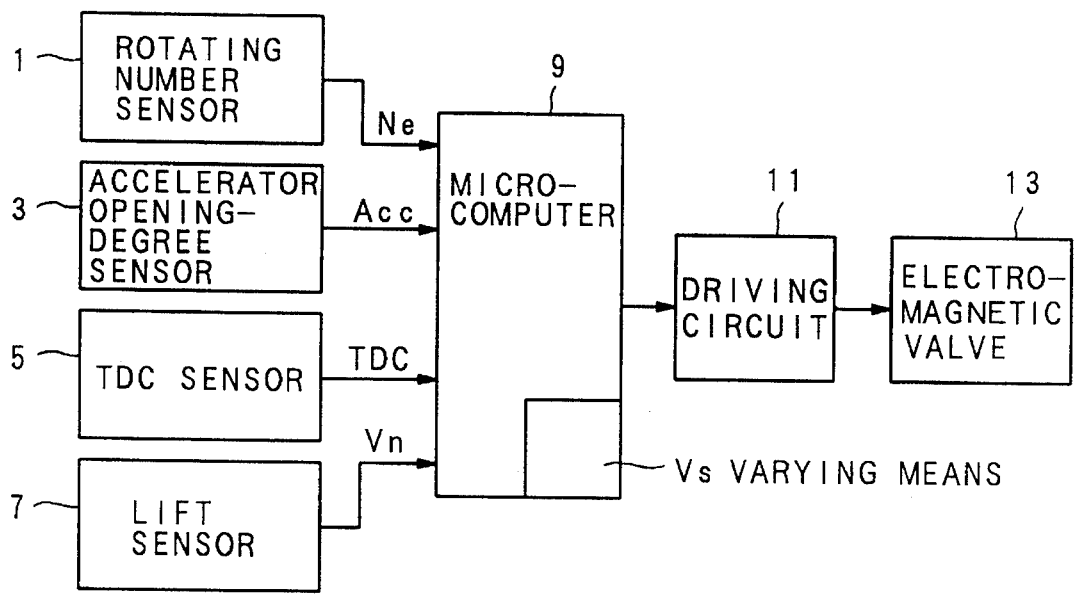
FIG. 2 is a block diagram showing the construction of an embodiment according to this invention.

FIG. 2 is a block diagram showing the construction of a fuel injection timing control device of an embodiment according to this invention.

As shown in FIG. 2, the fuel injection timing control device includes a microcomputer 9, an engine rotating number sensor 1 for detecting a rotating number Ne of an engine, an accelerator opening-degree sensor 3 for detecting an opening degree Acc of an accelerator, a top dead center sensor 5 for detecting a top dead center (TDC) of an engine crank, and a lift sensor 7 for detecting a lift amount Vn of a needle valve of an injection nozzle, these sensors being connected to the microcomputer 9.

On the basis of the outputs of these sensors, the microcomputer 9 performs a calculation processing as described later to generate an operation signal for controlling a fuel injection timing control. The fuel injection timing control device further includes a driving circuit 11 and an electromagnetic valve 13. The operation signal generated in the microcomputer is supplied to the driving circuit 11, and the driving circuit 11 controls an opening and closing operation of the electromagnetic valve 13 on the basis of the operation signal. As disclosed in Japanese Laid-open Patent Application No. 56-52530, the electromagnetic valve 13 is connected to a fuel injection pump, and it serves to adjust the pressure in a timer high-pressure chamber for adjusting a fuel injection timing in the pump. Through this adjustment operation, the fuel injection timing control is performed.

Figure 3:
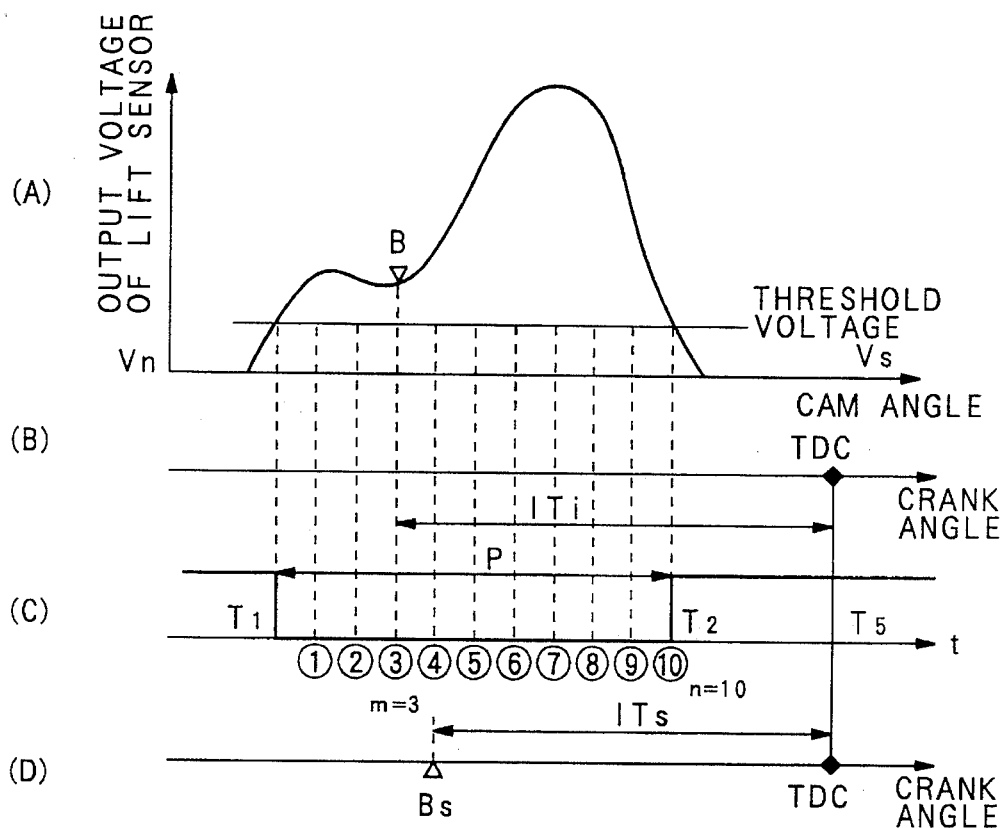
FIG. 3 is a diagram showing the operation of the embodiment.

FIG. 3 is a diagram showing the calculation processing which is executed by the microcomputer 9.

The first stage (A) at the uppermost stage of FIG. 3 represents variation of the output voltage Vn of the lift sensor 7, and a point B represents an ignition point. In order to detect the ignition point, the microcomputer 9 converts the waveform of the output voltage Vn of the lift sensor into a rectangular wave as shown in a third stage (C) with a predetermined threshold voltage Vs.

The ignition point B is calculated as follows using the rectangular wave thus obtained.

The time width (T2–T1=P) of the rectangular wave of (C) is first multiplied by a prescribed fraction (m/n) which is beforehand determined to define the position of the ignition point in the rectangular wave, thereby calculating the position of the ignition point within a crank period. In the embodiment of FIG. 3, the fraction (m/n) Is set to 3/10, and the calculated ignition point corresponds to the point B.

Subsequently, the microcomputer 9 counts a time from the time of the calculated ignition point B to the time when the top dead center sensor 5 detects the top dead center (TDC) shown in a second stage (B), and sets the counted time as a detection value ITi for the fuel injection timing. Thereafter, the microcomputer 9 compares the detection value ITi for the fuel injection timing with a target fuel injection timing ITs which is beforehand determined as shown in a fourth (lowermost) stage of FIG. 3, thereby obtaining an error (|ITs–ITi|) between ITi and ITs. Further, the microcomputer 9 conducts a PID (Proportional Integral and Derivative Control) operation on the error to generate an operation signal for the fuel injection timing control. That is, the value of ITi (the position of the B point) is varied so that the absolute value of the error (|ITs–ITi|) is approached to zero.

The threshold level Vs and the fraction (m/n) are determined in accordance with the fuel injection amount (load) Q and the rotating number (Ne) of an engine from a map. FIG. 4 shows the map which is beforehand provided in the microcomputer 9, and the above processing is performed with referring to this map.

As shown in FIG. 4, in this map, various combinations of the target fuel injection timing ITs, the threshold voltage Vs and the fraction (m/n) are set in accordance with various fuel injection amounts (loads) Q and the rotating numbers Ne of the engine. These values are optimum values which are beforehand obtained by an experiment.

Figure 1A:
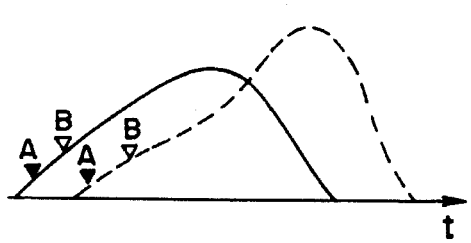
FIGS. 1A to 1C are graphs showing waveforms of an output signal of a needle valve lift sensor under various driving conditions, where
Figure 1B:
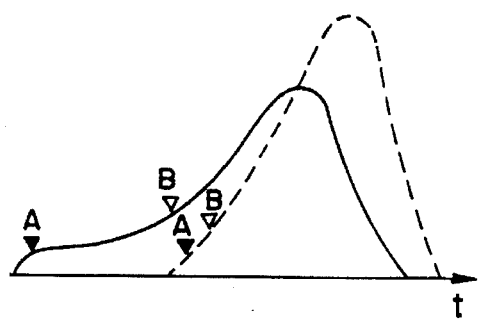
Figure 1C:
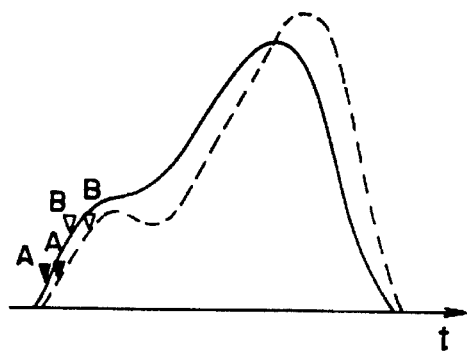

As described above with reference to FIG. 1, the time from the fuel injection start time (A point) to the ignition point (B point) is greatly varied in accordance with fuel viscosity, particularly in case of intermediate speed and intermediate load. However, as is expected from FIG. 1, the position of the ignition point within the rectangular wave (fraction m/n) can be prevented from being greatly varied in accordance with the fuel viscosity by selecting a suitable threshold voltage. For example, in case of the intermediate speed and the intermediate load, the position of the B point within the rectangular wave (fraction of m/n) can be set to be substantially constant by setting the threshold voltage to be slightly higher than the voltage of the point A.

In view of the foregoing, a threshold voltage Vs and a fraction of m/n are properly selected from the map of FIG. 4 so that the position of the ignition point within the rectangular wave is substantially constant irrespective of the fuel viscosity.

In order to improve resistance to noises and thus improve reliability of the fuel injection timing control, it is preferable that the threshold voltage Vs is set to be as high as possible within such a range that determination of a proper ignition point can be assured. In this point, it is significant that the threshold value Vs is not set to a fixed value, but it is set to a variable value in accordance with the condition shown in FIG. 4 in the microcomputer 9. Accordingly, means for varying the threshold voltage Vs or a function for varying the threshold voltage Vs is provided to the microcomputer 9. In this embodiment, the map and selection means for selecting proper threshold value and fraction (m/n) constitute the varying means.

Next, the detailed processing of the microcomputer 9 as described above will be described.

The microcomputer 9 stats a counter thereof to start a counting operation of a rotational period every time the top dead center sensor 5 detects the top dead center TDC of the crank. Subsequently, the microcomputer 9 is input with the engine rotating number Ne and the accelerator opening degree Acc from the rotating number sensor i and the accelerator opening-degree sensor 3, and first calculates a fuel injection amount (load) Q on the basis of these input values. Next, the microcomputer 9 refers to the map shown in FIG. 4, and reads out a fraction (m/n) from the map to determine a target fuel injection timing ITs, a threshold voltage Vs and an ignition point which are suitable for the engine rotating number Ne and the load Q. If the values input from the sensors are intermediate values between those values which are set in the map, interpolation is conducted on the values read out from the map with a prescribed interpolation equation to obtain the intermediate values.

Subsequently, the microcomputer 9 continuously checks the output voltage Vn of the lift sensor 7 to compare the output voltage Vn with the threshold voltage Vs. At the time when the output voltage Vn of the lift sensor exceeds the threshold voltage Vs, a count value at this time is stored as a start time (T1) of the rectangular wave. Thereafter, at the time when the output voltage Vn of the lift sensor falls below the threshold voltage Vs, the count value is stored as an end time (T2) of the rectangular wave.

Thereafter, the microcomputer 9 calculates the difference (T2–T1) between the stored start and end times T1 and T2 of the rectangular wave, multiplies the difference value by the selected fraction m/n to obtain a product value of m(T2–T1)/n, and adds the product value with the start time T1 to calculate the ignition point {(m(T2–T19/n+T1}. Thereafter, at the time when the TDC sensor 5 detects the top dead center at a next time, the count value at this time is stored as a rotational period (T3), and the calculated ignition point time is subtracted from the rotational period T3 to obtain the detection value ITi for the fuel injection timing (ITi=T3–(m(T2–T1)/n+T1)).

Next, the microcomputer 9 obtains an error ε=|ITs–ITi| between the calculated fuel injection timing detection value ITi and the target fuel injection timing ITs, and conducts the error on the PID operation to generate the operation signal. On the operation signal, the pressure of timer high-pressure chamber is adjusted on the basis of the operation signal to properly control the fuel injection timing.

The above processing is conducted every rotational period, whereby the ignition point can be controlled to the optimum timing at each period.

This invention is not limited to the above embodiment, and various modifications may be made to the above embodiment without departing from the subject matter of this invention. For example, in the above embodiment, both of integers m and n are beforehand set in the map to determine the ignition point. However, n may be fixed while m is variable. Further, the various values which are set in the map in the above embodiment are set as a function of the engine rotating numbers Ne and the loads Q, and each value may be obtained by calculation of the function.

As described above, according to the fuel injection timing control device of this invention, the output of the needle valve lift sensor is converted to a rectangular wave, and a prescribed timing within the rectangular wave is detected as a point for actual ignition. Therefore, the ignition point can be accurately detected irrespective of fuel viscosity, and the excellent fuel injection timing control can be performed at all times by using the detected ignition point as a control target.

What is claimed is:

1. A fuel injection timing control device for use in an internal combustion engine, including:

sensor means for detecting a lift amount of a needle valve of a fuel injection nozzle;

conversion means for converting an output signal of said sensor means to a rectangular wave using a predetermined threshold level; and ignition point calculating means for calculating a timing for actual fuel ignition on the basis of the rectangular wave in accordance with a driving condition of the internal combustion engine, wherein a fuel injection control is performed using the calculated ignition timing as a control target.

2. The fuel injection timing control device as claimed in claim 1, further including means for providing various threshold voltages and factors for determining an optimum ignition point within the rectangular wave in accordance with the driving condition.

3. The fuel injection timing control device as claimed in claim 2, wherein said providing means comprises means for storing the various threshold voltages and the factors as a map.

4. The fuel injection timing control device as claimed in claim 2, wherein said ignition point calculating means includes selection means for selecting from the map a threshold voltage and a factor which are optimum to a used driving condition, comparison means for comparing the output signal of said sensor means with the threshold voltage selected from the map to obtain the rectangular wave, and calculation means for multiplying the time width of the rectangular wave by the factor selected from the map to determine the ignition point.

5. The fuel injection timing control device as claimed in claim 4, wherein said ignition point calculating means further includes interpolating means for interpolating the threshold voltage and the factor read out from the map to obtain optimum threshold voltage and factor which do not exist in said providing means.

6. The fuel injection timing control device as claimed in claim 2, wherein said providing means includes means for determining a threshold voltage and a factor optimum to the driving condition by operating a function in which various threshold voltages and factors correspond to various driving conditions.

7. The fuel injection timing control device as claimed in claim 1, wherein the driving condition includes the rotating number of an engine and a fuel injection amount.

8. A fuel injection timing control method for an internal combustion engine comprising the steps of:

detecting a lift amount of a needle valve of a fuel injection nozzle to obtain a signal representing the lift amount;

converting the signal to a rectangular wave using a predetermined threshold level;

calculating a timing for fuel ignition on the basis of the rectangular wave in accordance with a driving condition of the internal combustion engine;

comparing the calculated fuel ignition timing with a predetermined target ignition fuel timing; and controlling an actual fuel injection timing so that the calculated fuel ignition timing is coincident with the target ignition fuel timing.

9. The fuel injection timing control method as claimed in claim 8, further comprising the steps of storing as a map various threshold voltages and factors for determining optimum threshold voltage and factor to the driving condition, and selection means for selecting from the map a threshold voltage and a factor which are optimum to the driving condition, and wherein said converting step includes a step of comparing the signal with the threshold voltage selected from the map to obtain the rectangular wave, and said calculating step includes a step of multiplying the time width of the rectangular wave by the factor selected from the map to determine the ignition point.

* * * * *